UNITED STATES PATENT OFFICE.

THEODOR FLEITMANN, OF ISERLOHN, PRUSSIA, GERMANY.

MANUFACTURE OF NICKEL-ZINC ALLOY.

SPECIFICATION forming part of Letters Patent No. 225,977, dated March 30, 1880.

Application filed October 17, 1879.

*To all whom it may concern:*

Be it known that I, THEODOR FLEITMANN, of Iserlohn, Prussia, have invented a new and Improved Process of Producing an Alloy of Zinc and Nickel, of which the following is a specification.

My invention relates to an improved process of producing an alloy of zinc and nickel.

Heretofore it has been assumed by Berzelius and other authorities that such an alloy could not be made from the mixed oxides of the metals on account of the volatile nature of the zinc, whereby, when the oxides of the metals were heated in a reducing-furnace, the low temperature at which the zinc volatilized, compared to the melting-point of the nickel, caused the zinc to be driven off or evaporated before the nickel was in condition to combine with the zinc. In fact, the books show that the process was recommended for insuring an analytical separation of the two metals by evaporating the zinc.

Other metals—as, for instance, copper—have been combined with nickel by directly reducing "garnierite" and the oxide of copper in a suitable furnace with a suitable reducing agent; but this method is not applicable to alloying the nickel with zinc, for the reason above referred to.

The object of my invention is to produce a practicable alloy of pure zinc and pure nickel containing about five to ten per centum of zinc; and the invention consists, essentially, in mixing together the oxides of zinc and nickel, and then reducing the mixed oxides by means of carbon or other suitable reducing agent.

In carrying my process into effect several modes of mixing the oxides may be adopted, as follows:

First. The metallic zinc and nickel may be first dissolved by means of a suitable acid, and then precipitated by means of an alkali or other suitable base, so as to form oxides of the zinc and nickel. These mixed oxides are then placed in a furnace with a reducing agent—as carbon, for example—and heated to a glowing or white heat, whereby the metals are deoxidized, and they are then purified in the usual manner of purifying nickel.

Second. Mixtures of combinations of the two metals—as, for example, oxalic or carbonic combinations of nickel and zinc—are, by heating to a glowing or white heat, transformed to oxides of the respective metals, and then the two oxides, together with a reducing agent—as carbon, for example—are heated together and reduced and purified as before.

Third. A mechanical mixture of the two oxides may also be made. For example, purified oxide of nickel is mixed with a sufficient quantity of purified oxide of zinc, and the resulting mixture of the oxides is then reduced as before.

Fourth. Another mode is to partially reduce and finely divide the oxide of nickel, and then mix the said oxide so treated with the oxide of zinc, and then glow or heat to a white heat the two oxides together and reduce them at the same time with a reducing medium. In this mode the zinc vapors combine *in statu nascenti* with the finely-divided nickel; or zinc vapors may be introduced into nickel which has been reduced from oxide of nickel and brought to a spongy condition.

The product of the oxides of zinc and nickel mixed together and reduced, as aforementioned, should be rapidly melted after undergoing the above treatment, and the result of this melting is the production of a zinciferous-nickel casting of great tenacity, containing no less than five per centum of zinc. This product is susceptible of being worked into plates, wire, &c., which can be drawn in suitable machinery, either in a cold or in a heated condition.

The alloy thus produced possesses many excellent qualities as to toughness and density, and if one-tenth ($\frac{1}{10}$) of one per cent. of magnesium is added an exceedingly tenacious and ductile material is furnished, having otherwise all the properties of pure nickel.

I desire it to be well understood that the alloy cannot be produced by adding metallic zinc to melted nickel, as the melting-heat of the latter will invariably cause the zinc to violently evaporate.

The proportions of the zinc and nickel oxides are immaterial so long as there is more oxide of nickel used than of zinc.

I claim—

The process of producing an alloy of nickel and zinc by mixing oxide of nickel and oxide of zinc and then reducing the mixture and rapidly melting the same, substantially as specified.

This specification signed by me this 23d day of August, 1879.

DR. T. FLEITMANN.

Witnesses:
MAX FARBER,
FRIEDRICH SCHROEDER.